US012546901B2

(12) United States Patent
Keyzer et al.

(10) Patent No.: US 12,546,901 B2
(45) Date of Patent: Feb. 10, 2026

(54) GNSS MULTIPLE SATELLITE FAILURE DETECTION USING SOLUTION SEPARATION MEASUREMENT MONITORING

(71) Applicant: Honeywell International Inc., Charlotte, NC (US)

(72) Inventors: Karl Abraham Keyzer, Minneapolis, MN (US); Benjamin Meier, Shakopee, MN (US); Radek Baranek, Brno (CZ); Radek Reznicek, Zahorovice (CZ); Matej Kucera, Nova Hut (CZ)

(73) Assignee: Honeywell International Inc., Charlotte, NC (US)

( * ) Notice: Subject to any disclaimer, the term of this patent is extended or adjusted under 35 U.S.C. 154(b) by 355 days.

(21) Appl. No.: 18/149,604

(22) Filed: Jan. 3, 2023

(65) Prior Publication Data

US 2024/0230921 A1 Jul. 11, 2024

(51) Int. Cl.
  *G01S 19/39* (2010.01)
  *G01S 19/23* (2010.01)
(52) U.S. Cl.
  CPC ............ *G01S 19/393* (2019.08); *G01S 19/23* (2013.01)
(58) Field of Classification Search
  CPC ............................... G01S 19/393; G01S 19/23
  (Continued)

(56) References Cited

U.S. PATENT DOCUMENTS 5,760,737 A    6/1998 Brenner
6,639,549 B2  10/2003 Vanderwerf et al.
(Continued)

FOREIGN PATENT DOCUMENTS

CN    111142125 A       5/2020
EP      3901664 A1     10/2021
WO    WO-2011046866 A1 *  4/2011  ............. G01S 19/40

OTHER PUBLICATIONS

European Patent Office, "Partial European Search Report", dated Jun. 6, 2024, from U.S. Appl. No. 18/149,604, from Foreign Counterpart to U.S. Appl. No. 18/149,604, pp. 1 through 13, Published: EP.

(Continued)

*Primary Examiner* — William Kelleher
*Assistant Examiner* — Samarina Makhdoom
(74) *Attorney, Agent, or Firm* — Fogg & Powers LLC (57) ABSTRACT

A method for detecting failure of multiple satellite signals comprises receiving satellite signals in a GNSS receiver; processing the satellite signals in a Kalman filter to produce a navigation solution and sub-solutions; and performing at least one of a residual monitoring process, or a state corrections monitoring process. In the residual monitoring process, for each sub-solution, expected and actual residuals are computed and compared to determine whether the actual residuals are greater than a threshold; multiple erroneous measurements are detected when at least one actual residual is greater than the threshold for each sub-solution. In the state corrections monitoring process, for each sub-solution, an expected and actual magnitude of state corrections are computed and compared to determine whether the actual magnitude of state corrections is greater than a threshold; multiple erroneous measurements are detected when the actual magnitude of state corrections is greater than the threshold for each sub-solution.

20 Claims, 4 Drawing Sheets

(58) Field of Classification Search
USPC .................................................. 342/357.62
See application file for complete search history.

(56) References Cited

U.S. PATENT DOCUMENTS

| | | | |
|---|---|---|---|
| 8,416,133 B2 | 4/2013 | Hatch et al. | |
| 9,291,714 B2 | 3/2016 | Vourc'h | |
| 9,341,718 B2 | 5/2016 | Vanderwerf | |
| 10,018,729 B2 | 7/2018 | Dunik et al. | |
| 10,996,345 B2 | 5/2021 | Brenner | |
| 11,442,174 B2 | 9/2022 | Cao et al. | |
| 2011/0238307 A1* | 9/2011 | Psiaki | G01S 19/31 701/469 |
| 2018/0180743 A1* | 6/2018 | Hide | G01S 19/13 |
| 2020/0249361 A1 | 8/2020 | McDonald et al. | |
| 2021/0333409 A1* | 10/2021 | Cao | G01S 19/40 |
| 2022/0057526 A1* | 2/2022 | Keyzer | G01S 19/26 |
| 2022/0171073 A1* | 6/2022 | Savoy, Jr. | G01S 19/215 |

OTHER PUBLICATIONS

Liu et al. "GNSS Spoofing Detection Ability of a Loosely Coupled INS/GNSS Integrated Navigation System for Two Integrity Monitoring Methods", Proceedings of the 2017 International Technical Meeting of the Institute of Navigation, Feb. 1, 2017, pp. 912 through 921.

European Patent Office, "Extended European Search Report", dated Aug. 27, 2024, from EP Application No. 23215473.2, from Foreign Counterpart to U.S. Appl. No. 18/149,604, pp. 1 through 11, Published: EP.

* cited by examiner

GNSS MULTIPLE SATELLITE FAILURE DETECTION USING SOLUTION SEPARATION MEASUREMENT MONITORING

BACKGROUND

Various methods exist for detection of an individual erroneous Global Navigation Satellite System (GNSS) satellite measurement. Some detection methods use GNSS front-end signal monitoring, such as, for example, monitoring for an abnormal shape of a correlation signal peak due to overlapping authentic and spoofed signals. Such techniques, however, imposes hardware and processing needs on the system that may not be available or possible. Another disadvantage of this approach is that it can only be carried out in the GNSS receiver. Since commercial inertial navigation system (INS) and GNSS solutions are performed in a downstream system, this data is not available.

Other detection methods employ measurement monitoring using a single INS/GNSS solution, in which inconsistencies can potentially be detected. However, a disadvantage is that in some scenarios, these methods cannot determine whether single or multiple measurements may be in error. During a spoofing scenario, it is likely that multiple satellites are being spoofed, and thus it is critical to determine whether multiple, or only possibly a single satellite is in error. It is expected that the INS/GNSS system can continue to process measurements even in the event of a single satellite failure.

Some methods that employ measurement monitoring using a single INS/GNSS solution perform "pre-update" measurement residual/innovation screenings that are dependent on the order that measurements are processed. These methods may be less capable of detecting measurement errors based on where in the sequence a particular measurement is processed. Other methods that employ measurement monitoring using a single INS/GNSS solution perform "post-update" measurement residual/innovation screenings, which can be designed to be agnostic to the satellite processing order. However, these methods may be less capable of detecting spoofing since the measurement set may be self-consistent. Additional methods that employ measurement monitoring using a single INS/GNSS solution monitor for excessive Kalman filter state corrections, but do not differentiate between whether there is a single satellite or multiple satellites that are in error.

Other detection methods utilize the solution separation technique, which is reliant on the assumption that only a single satellite error will be present at a given time. This technique can detect and eventually isolate errors on single satellites. However, when there are detected inconsistencies, the solution separation technique may not be able to differentiate between multiple satellite failures, or a single satellite that is in error but where the error is not large enough to be identified and isolated.

As threats such as GNSS spoofing are becoming more prevalent, in which typically most if not all GNSS measurements are impacted, and where the measurement set may be self-consistent, there is a need for methods that are able to detect multiple simultaneous erroneous GNSS measurements.

SUMMARY

A method for detecting failure of multiple navigation satellite signals comprises: receiving a plurality of satellite signals in at least one GNSS receiver from multiple GNSS satellites, the GNSS receiver in operative communication with at least one processor that includes a Kalman filter; processing the satellite signals in the Kalman filter to produce a navigation solution and a plurality of sub-solutions; and performing at least one of a first Kalman filter monitoring process, or a second Kalman filter monitoring process. The first Kalman filter monitoring process comprises: determining an expected magnitude of measurement residuals in the Kalman filter for each of the sub-solutions; computing an actual magnitude of measurement residuals in the Kalman filter for each of the sub-solutions; comparing the expected magnitude of measurement residuals to the actual magnitude of measurement residuals, for each of the sub-solutions, to determine whether the actual magnitude of measurement residuals is greater than a residual threshold; and detecting multiple erroneous GNSS measurements when at least one of the actual magnitude of measurement residuals is greater than the residual threshold for each of the sub-solutions. The second Kalman filter monitoring process comprises: determining an expected magnitude of state corrections in the Kalman filter for each of the sub-solutions; computing an actual magnitude of state corrections in the Kalman filter for each of the sub-solutions; comparing the expected magnitude of state corrections to the actual magnitude of state corrections, for each of the sub-solutions, to determine whether the actual magnitude of state corrections is greater than a state corrections threshold; and detecting multiple erroneous GNSS measurements when the actual magnitude of state corrections is greater than the state corrections threshold for each of the sub-solutions.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for detecting multiple navigation satellite signal failures, using solution separation measurement monitoring, is described herein.

The present approach provides a technique to detect multiple simultaneous erroneous GNSS measurements within an INS/GNSS system. Additionally, this approach can use the detection of multiple erroneous GNSS measurements as a detection of GNSS spoofing. Once spoofing is detected, an alert can be raised, and in addition, the GNSS measurements can be discarded in order to protect the INS/GNSS solution, thus mitigating the spoofing threat.

The present methods allow for detecting simultaneous errors from multiple satellite signals without interfering with techniques that have single satellite detection and exclusion capability. For example, the solution separation method maintains sub-solutions that do not process measurements from a particular satellite. This allows each sub-solution to not be impacted by a particular satellite (unique to that sub-solution). There can additionally be sub-sub-solutions that do not process measurements from two satellites. Given an assumed satellite failure rate of 1e-5/hr, the probability of a dual satellite failure is negligible for most applications. Thus, detection of multiple satellite failures can be assumed to be due to spoofing.

In a first method of the present approach, for each sub-solution, Kalman filter residuals are computed for each measurement. If at least one residual is above a threshold for all sub-solutions, then at least two satellite measurements are in error. In the second method of the present approach, for each sub-solution, a Kalman filter measurement update is computed. If a state correction is larger than an expected amount based on the pre and post-update error state covariance, and this exists across all sub-solutions, then at least two satellite measurements are in error. The first and second methods can be used separately or together, to detect a spoofing event.

The thresholds used in the present methods can be pre-defined (fixed) thresholds, or can be variable thresholds. In one example of using variable thresholds, a first variable threshold can provide for supporting initial detection of spoofing, and then a second (presumably lower) threshold can be used to determine when spoofing is no longer present. In another example of using variable thresholds, one spoofing detection threshold can be used for nominal scenarios in which the GNSS measurements are continuously available, and a different threshold can be used when assessing GNSS measurements that were lost for some period of time before being re-acquired. This different threshold can also vary based on the length of the period of time that GNSS measurements were unavailable.

Further details regarding the present approach are described as follows and with reference to the drawings.

Figure 1:
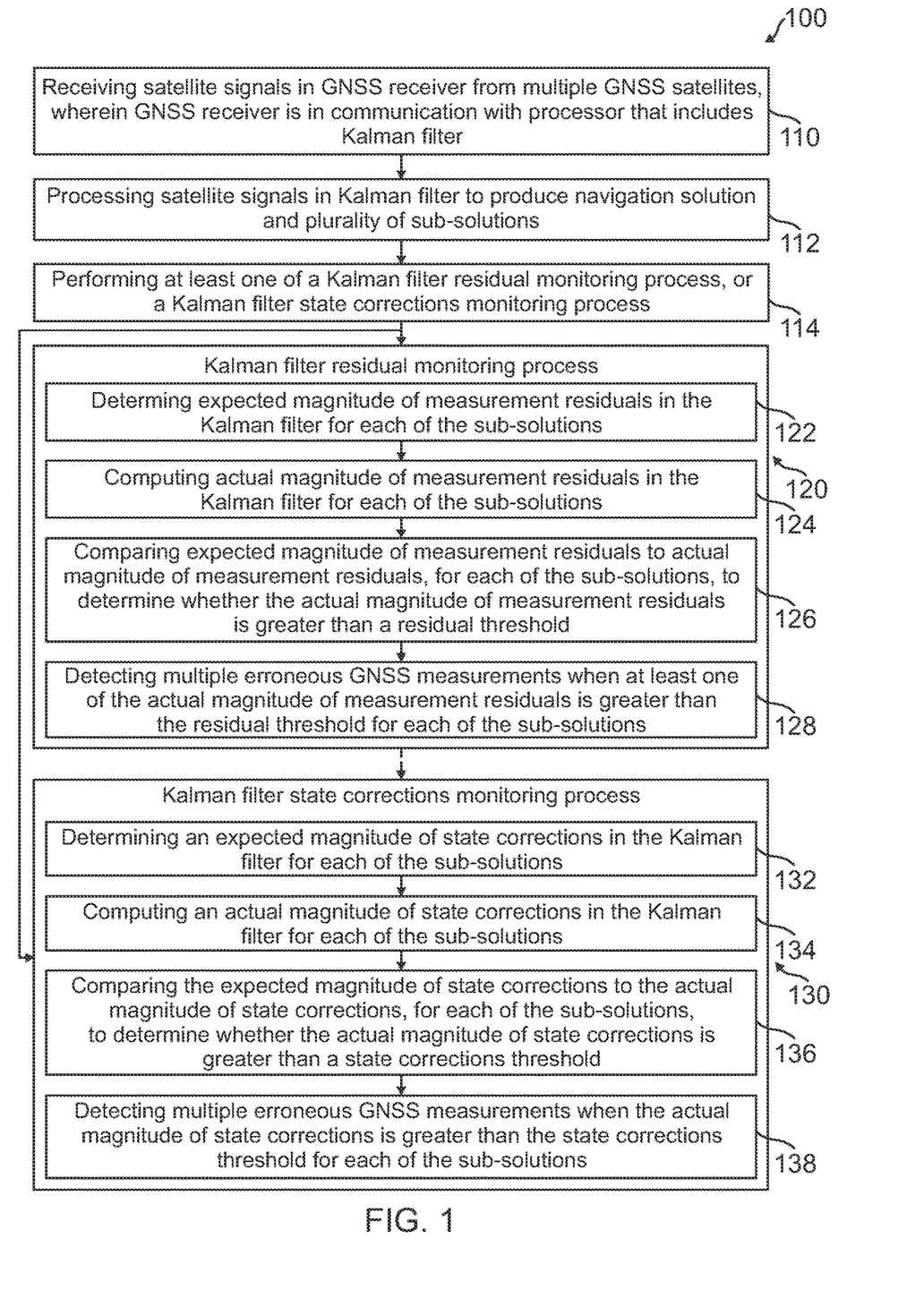
FIG. 1 is a flow diagram of a method for detecting failure of multiple navigation satellite signals, according to an exemplary implementation.

FIG. 1 is a flow diagram of a method 100 for detecting failure of multiple navigation satellite signals, according to an exemplary implementation. The method 100 comprises receiving a plurality of satellite signals in at least one GNSS receiver from multiple GNSS satellites (block 110), wherein the GNSS receiver is in operative communication with at least one processor that includes at least one Kalman filter. The method 100 processes the satellite signals in the at least one Kalman filter to produce a navigation solution and a plurality of sub-solutions (block 112). The method 100 then performs at least one of a Kalman filter residual monitoring process 120, or a Kalman filter state corrections monitoring process 130 (block 114).

The Kalman filter residual monitoring process 120 comprises determining an expected magnitude of measurement residuals in the Kalman filter for each of the sub-solutions (block 122) and computing an actual magnitude of measurement residuals in the Kalman filter for each of the sub-solutions (block 124). The Kalman filter residual monitoring process 120 then compares the expected magnitude of measurement residuals to the actual magnitude of measurement residuals, for each of the sub-solutions, to determine whether the actual magnitude of measurement residuals is greater than a residual threshold (block 126). The Kalman filter residual monitoring process 120 detects multiple erroneous GNSS measurements when at least one of the actual magnitude of measurement residuals is greater than the residual threshold for each of the sub-solutions (block 128).

The Kalman filter state corrections monitoring process 130 comprises determining an expected magnitude of state corrections in the Kalman filter for each of the sub-solutions (block 132), and computing an actual magnitude of state corrections in the Kalman filter for each of the sub-solutions (block 134). The Kalman filter state corrections monitoring process 130 then compares the expected magnitude of state corrections to the actual magnitude of state corrections, for each of the sub-solutions, to determine whether the actual magnitude of state corrections is greater than a state corrections threshold (block 136). The Kalman filter state corrections monitoring process 130 detects multiple erroneous GNSS measurements when the actual magnitude of state corrections is greater than the state corrections threshold for each of the sub-solutions (block 138).

Figure 2:
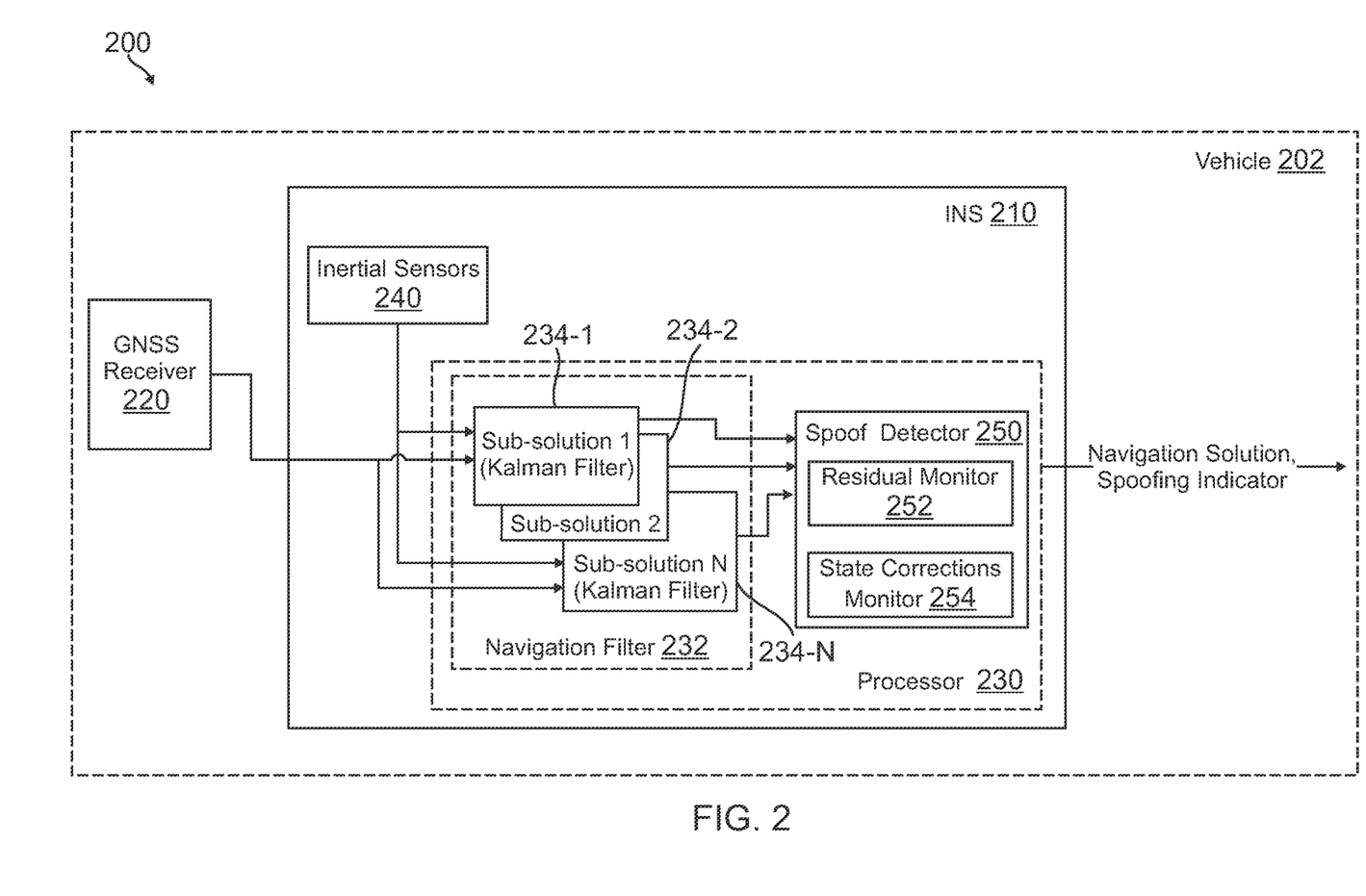
FIG. 2 is a block diagram of a system for detecting failure of multiple navigation satellite signals, according to an exemplary embodiment.

FIG. 2 is a block diagram of a system 200 for detecting failure of multiple navigation satellite signals, according to an exemplary embodiment. The system 200 generally includes an inertial navigation system (INS) 210 in a vehicle 202, and a GNSS receiver 220 in vehicle 202 that is configured to receive a plurality of satellite signals from multiple GNSS satellites. The INS 210 is in operative communication with GNSS receiver 220. The vehicle 202 can be a manned aircraft, an unmanned aircraft systems (UAS) vehicle, an urban air mobility (UAM) vehicle, or the like.

The INS 210 includes at least one processor 230, and a set of inertial sensors 240 such as an inertial measurement unit (IMU). The inertial sensors 240 are operative to produce inertial (e.g., accelerometer and gyroscope) measurements for vehicle 202, which are used by INS 210 to generate estimated kinematic state statistics for vehicle 202. The processor 230 is operative to receive data outputs from GNSS receiver 220 and inertial sensors 240.

The processor 230 hosts at least one navigation filter 232 such as one or more Kalman filters, and a spoof detector module 250, which is operative to detect spoofing of the satellite signals received by GNSS receiver 220. The spoof detector module 250 includes a residual monitor 252 and a state corrections monitor 254, which can be used separately or together, to detect a spoofing event as described further hereafter.

The processor 230 is operative to processes the satellite signals from GNSS receiver 220 and the inertial measurements from inertial sensors 240 in navigation filter 232 to produce a navigation solution and a plurality of sub-solutions. The sub-solutions are represented as sub-solution 1 (Kalman filter, block 234-1), sub-solution 2 (Kalman filter, block 234-2), . . . sub-solution N (Kalman filter, block 234-N). The sub-solutions are sent to spoof detector module 250 for use by residual monitor 252 and/or state corrections monitor 254, as discussed in further detail with respect to FIGS. 3 and 4 hereafter.

The spoof detector module 250 is operative to perform residual monitoring or state corrections monitoring, or both residual monitoring and state corrections monitoring, to detect a spoofing event. The spoof detector module 250 is operative to output a navigation solution, with a spoofing indicator if a spoof event is detected.

Figure 3:
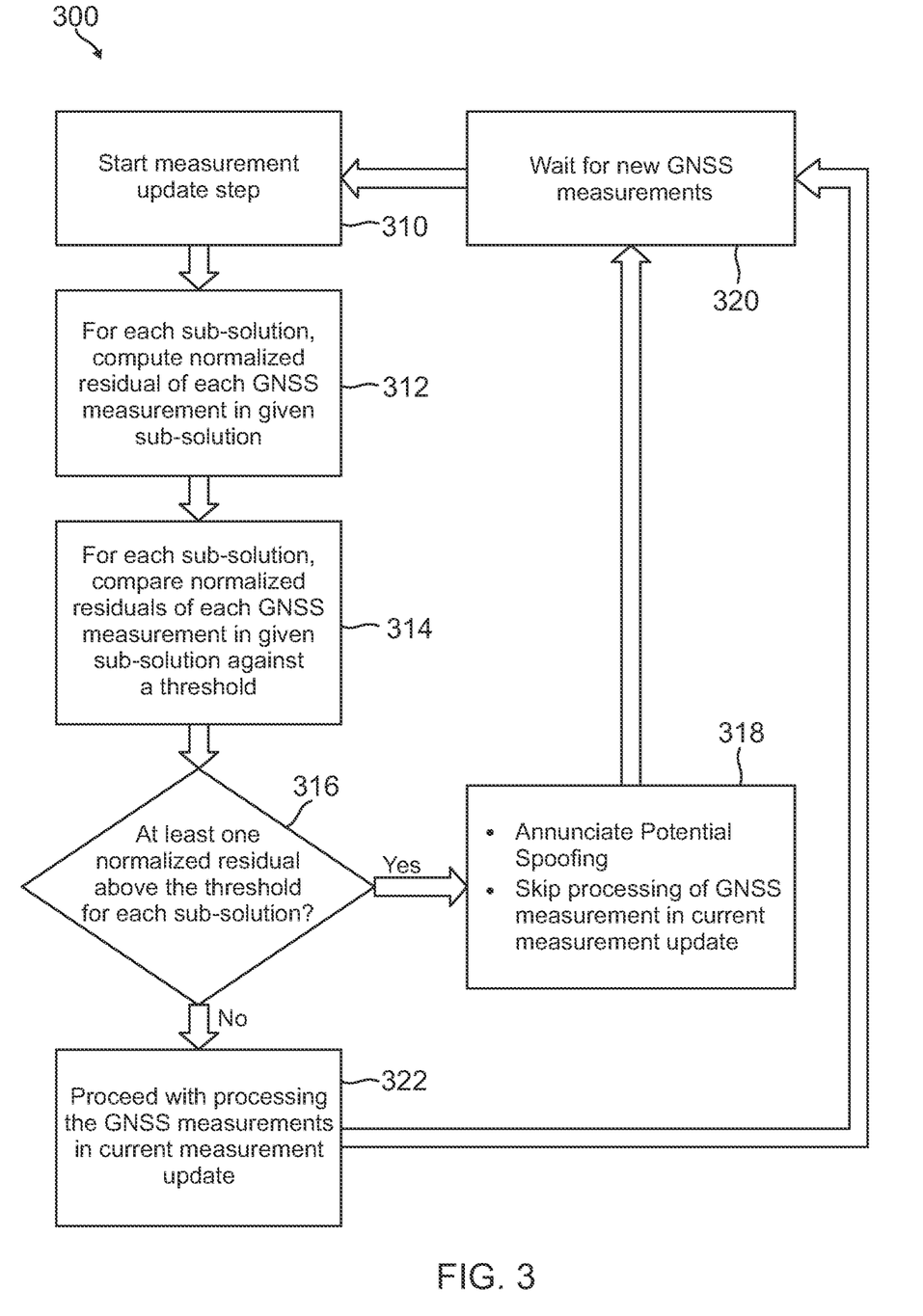
FIG. 3 is a flow diagram of a method for residual monitoring, according to one implementation, which can be implemented in the system of FIG. 2.

FIG. 3 is a flow diagram of a method 300 for residual monitoring, according to one implementation, which can be implemented by residual monitor 252 in the system of FIG. 2. Initially, method 300 starts a measurement update step (block 310), and for each sub-solution computes a normalized residual of each GNSS measurement in the given sub-solution (block 312). For each sub-solution, method 300 then compares the normalized residuals of each GNSS measurement in the given sub-solution against a threshold (block 314). The method 300 then determines whether at least one normalized residual is above the threshold for each sub-solution (block 316). If yes, method 300 annunciates potential spoofing, such as by sending an alert to a user, and skips processing of the GNSS measurement in the current measurement update (block 318). The method 300 then waits for new GNSS measurements (block 320), and when a new GNSS measurement is received, method 300 repeats the above steps starting with a new measurement update step at block 310.

Returning to block 316, if the determination is made that there is not at least one normalized residual above the threshold for each sub-solution, then method 300 proceeds with processing the GNSS measurements in the current measurement update (block 322). The method 300 then waits for new GNSS measurements (block 320), and when a new GNSS measurement is received, method 300 repeats the above steps starting with a new measurement update step at block 310.

Figure 4:
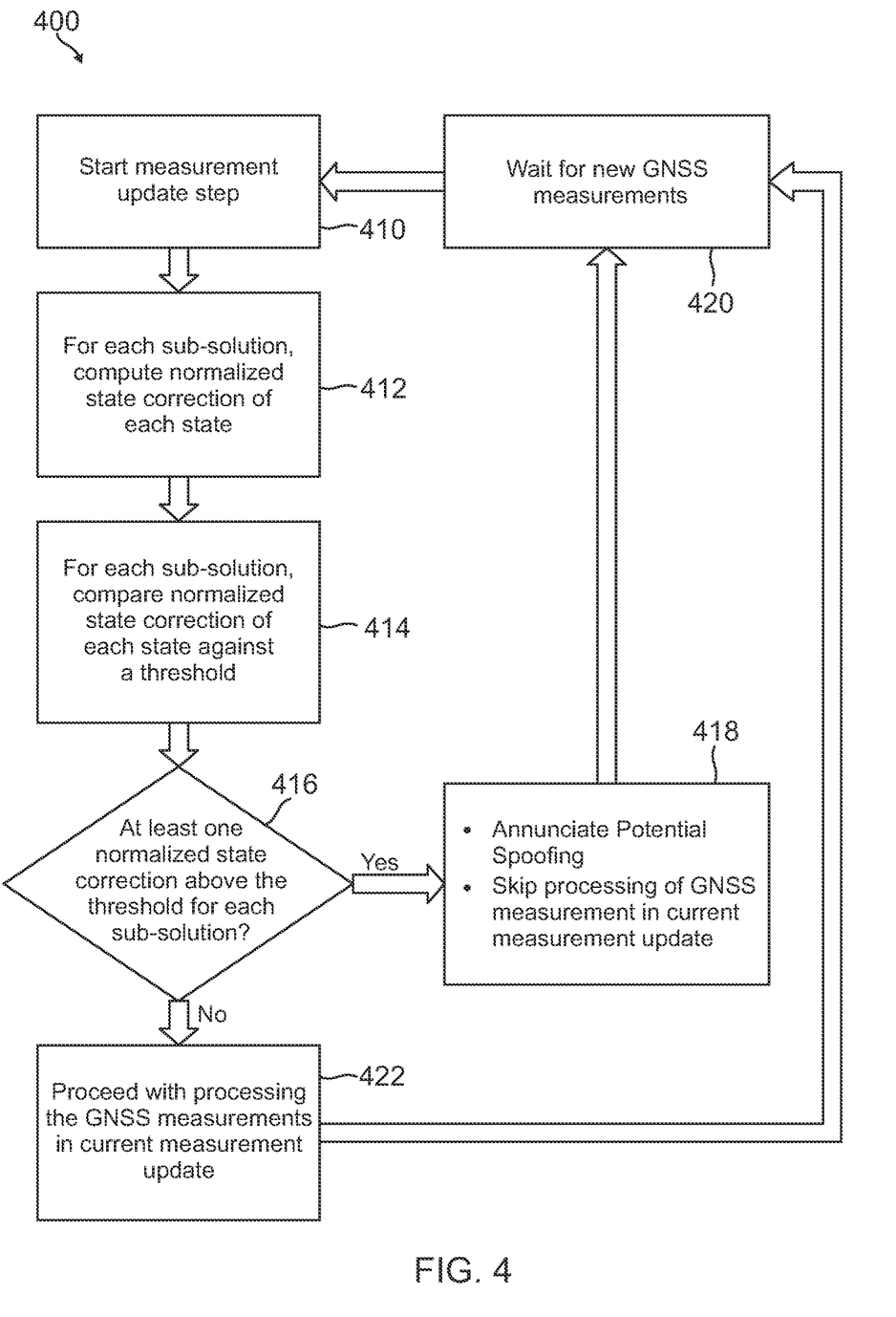
FIG. 4 is a flow diagram of a method for state corrections monitoring, according to one implementation, which can be implemented in the system of FIG. 2.

FIG. 4 is a flow diagram of a method 400 for state corrections monitoring, according to one implementation, which can be implemented by state corrections monitor 254 in the system of FIG. 2. Initially, method 400 starts a measurement update step (block 410), and for each sub-solution, computes a normalized state correction of each state (block 412). For each sub-solution, method 400 then compares the normalized state correction for each state against a threshold (block 414). The method 400 then determines whether at least one normalized state correction is above the threshold for each sub-solution (block 416). There are two logic options in making this determination: 1) require the normalized state correction to be above the threshold for the same state; or 2) allow any state to be above the threshold. If the determination is made that there is at least one normalized state correction above the threshold for each sub-solution (at block 416), then method 400 annunciates potential spoofing, such by sending an alert to a user, and skips processing of the GNSS measurement in the current measurement update (block 418). The method 400 then waits for new GNSS measurements (block 420), and when a new GNSS measurement is received, method 400 repeats the above steps starting with a new measurement update step at block 410.

Returning to block 416, if the determination is made that there is not at least one normalized state correction above the threshold for each sub-solution, then method 400 proceeds with processing the GNSS measurements in the current measurement update (block 422). The method 400 then waits for new GNSS measurements (block 420), and when a new GNSS measurement is received, method 400 repeats the above steps starting with a new measurement update step at block 410.

Further details of the methods for residual monitoring and state corrections monitoring using Kalman filters are described as follow.

Kalman Filter Measurement Residual Monitoring

The monitoring of Kalman filter measurement residuals to detect multiple simultaneous measurements generally includes: determining the expected magnitude of the Kalman filter residuals (i.e., Kalman filter measurement residual uncertainty); computing the Kalman filter measurement residuals; and comparing the Kalman filter measurement residuals to the Kalman filter measurement residual uncertainty to determine whether the measurement residuals are unreasonable. If it is determined that at least one Kalman filter measurement residual is unreasonable for each sub-solution, then multiple erroneous GNSS measurements have been detected, and it can be inferred that GNSS spoofing may be present.

To determine the reasonableness of the Kalman filter measurement residuals, first define the measurement update equations as follows:

$$S = HPH^T + R$$
$$K = PH^T S^{-1}$$
$$y = z - Hx$$
$$x = x + Ky$$
$$P = P - KHP$$

where the particular signals are:
x: Kalman Filter State Vector;
P: Kalman Filter Error State Covariance Matrix;
H: Measurement Mapping Matrix;
R: Measurement Noise Covariance Matrix;
K: Kalman Gain Matrix;
y: Measurement Residual Vector;
z: Measurement Vector;
and for a particular measurement, id:
r=R(id, id): Measurement Noise Variance;
h=H(id, :): Measurements Mapping Vector.

Then, a sequential measurement update of the Kalman filter can be performed, which includes the normalized residuals computation as follows:

$$\text{For if} = 1 \ldots N \text{ (number of measurements)},$$
$$s = h^T Ph + r$$
$$k = Phs^{-1}$$
$$y(id) = z(id) - hx$$
$$normResid(id) = \frac{y(id)}{\sqrt{s}}$$
$$x = x + ky$$
$$P = P - kh^T P.$$

An example algorithm for monitoring of Kalman filter measurement residuals follows.

Compute the normalized residual for each measurement for each sub-solution:

```
For each sub-solution, n:
    excessiveResidual_n = False
    For each measurement, id:
        If |normResid_n(id)| > THRESHOLD
            excessiveResidual_n = True
```

```
        End If
    End For
End For.
```

Determine if all sub-solutions have detected an excessive state correction:

```
excResidAllSubSolutions = True
For each sub-solution, n:
    If excessiveResidual_n is False
        excResidAllSubSolutions = False
    End If
End For.
```

Thus, if excResidAllSubSolutions indicates "True", then multiple erroneous GNSS measurements are detected, implying GNSS spoofing may be present.

Kalman Filter State Corrections Monitoring

The monitoring of Kalman filter state corrections for unreasonable values generally includes: determining the expected magnitude of the Kalman filter state corrections; computing the actual Kalman filter state corrections; and comparing the actual Kalman filter state corrections to the expected magnitude of the Kalman filter state corrections to determine whether the state corrections are unreasonable for each sub-solution. If it is determined that the state corrections are unreasonable for each sub-solution, then multiple erroneous GNSS measurements have been detected, and it can be inferred that GNSS spoofing may be present.

To determine the reasonableness of the state corrections, first determine the expected magnitude of the state corrections as follows.

$$\text{Let: } E\{x_{pre}(x_{pre})^T\} = P_{pre}$$
$$E\{x_{post}(x_{post})^T\} = P_{post}$$
$$E\{yy^T\} = S = HPH^T + R$$
$$K = P_{pre}H^T S^{-1}$$
$$\text{where } x_{post} = x_{pre} + Ky$$
$$y = z - Hx_{pre}$$

and where the particular signals are:
$X_{pre}$: Kalman filter states before the measurement update;
$X_{post}$: Kalman filter states after the measurement update;
$P_{pre}$: Kalman Filter Error State Covariance Matrix before the measurement update;
$P_{post}$: Kalman Filter Error State Covariance Matrix after the measurement update;
H: Measurement Mapping Matrix;
R: Measurement Noise Covariance Matrix;
K: Kalman Gain Matrix;
y: Measurement Residual Vector;
z: Measurement Vector.
Then:

$$P_{post} = (I - KH)P_{pre} = P_{pre} - KHP_{pre} =$$
$$P_{pre} - P_{pre}H^T S^{-1}HP_{pre} \leftrightarrow P_{pre} - P_{post} = P_{pre}H^T S^{-1}HP_{pre}.$$

Now, compute the expected covariance of the state corrections:

$$E\{(x_{post} - x_{pre})(x_{post} - x_{pre})^T\}$$
$$= E\{(x_{pre} + Ky - x_{pre})(x_{pre} + Ky - x_{pre})^T\}$$
$$= E\{(Ky)(Ky)^T\}$$
$$= E\{(Kyy^T K^T)\}$$
$$= KE\{yy^T\}K^T$$
$$= KSK^T$$
$$= P_{pre}H^T S^{-1} S(P_{pre}H^T S^{-1})^T$$
$$= P_{pre}H^T S^{-1} SS^{-1} HP_{pre}$$
$$= P_{pre}H^T S^{-1} HP_{pre}$$

and substituting from above yields:

$$E\{(Ky)(Ky)^T\} = P_{pre} - P_{post}.$$

Thus, the covariance of the state corrections is given by the difference in the pre- and post-update state covariance matrices. The variance of each state correction is given by the corresponding diagonal element of the difference between the pre and post-update covariance matrices.

An example algorithm for monitoring of Kalman filter state corrections follows:

Compute the normalized state correction for each sub-solution:

```
For each sub-solution, n:
    excessiveStateCorr_n = False
    For each state, i:
        normStateCorr_n(i) = Δx(i) / √(dP(i, i))
    where
        dP = (P_pre)_n - (P_post)_n
        Δx = K_n y_n = (x_post)_n - (x_pre)_n
        If (|normStateCorr_n(i)|) > THRESHOLD
            excessiveStateCorr_n = True
        End If
    End For
End For.
```

Determine if all sub-solutions have detected an excessive state correction:

```
excStateCorrAllSubSolutions = True
For each sub-solution, n:
    If (excessiveStateCorr_n is False)
        excStateCorrAllSubSolutions = False
    End If
End For.
```

Thus, if excStateCorrAllSubSolutions indicates "True", then multiple erroneous GNSS measurements are detected, implying GNSS spoofing may be present.

The processing units and/or other computational devices used in systems and methods described herein may be implemented using software, firmware, hardware, or appropriate combinations thereof. The processing unit and/or other computational devices may be supplemented by, or incorporated in, specially designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a method for detecting failure of multiple navigation satellite signals, the method comprising: receiving a plurality of satellite signals in at least one Global Navigation Satellite System (GNSS) receiver from multiple GNSS satellites, the GNSS receiver in operative communication with at least one processor that includes a Kalman filter; processing the satellite signals in the Kalman filter to produce a navigation solution and a plurality of sub-solutions; and performing at least one of a first Kalman filter monitoring process, or a second Kalman filter monitoring process; wherein the first Kalman filter monitoring process comprises: determining an expected magnitude of measurement residuals in the Kalman filter for each of the sub-solutions; computing an actual magnitude of measurement residuals in the Kalman filter for each of the sub-solutions; comparing the expected magnitude of measurement residuals to the actual magnitude of measurement residuals, for each of the sub-solutions, to determine whether the actual magnitude of measurement residuals is greater than a residual threshold; and detecting multiple erroneous GNSS measurements when at least one of the actual magnitude of measurement residuals is greater than the residual threshold for each of the sub-solutions; wherein the second Kalman filter monitoring process comprises: determining an expected magnitude of state corrections in the Kalman filter for each of the sub-solutions; computing an actual magnitude of state corrections in the Kalman filter for each of the sub-solutions; comparing the expected magnitude of state corrections to the actual magnitude of state corrections, for each of the sub-solutions, to determine whether the actual magnitude of state corrections is greater than a state corrections threshold; and detecting multiple erroneous GNSS measurements when the actual magnitude of state corrections is greater than the state corrections threshold for each of the sub-solutions.

Example 2 includes the method of Example 1, wherein the first Kalman filter monitoring process or the second Kalman filter monitoring process, operate on a single measurement from each GNSS satellite at a given point in time over multiple time frames.

Example 3 includes the method of any of Examples 1-2, wherein each of the sub-solutions is a separate solution, based on the Kalman filter, which does not process measurements from a particular one of the multiple GNSS satellites at a given point in time.

Example 4 includes the method of any of Examples 1-3, wherein in the second Kalman filter monitoring process: the actual magnitude of state corrections is greater than the state corrections threshold for the same state in each of the sub-solutions; or the actual magnitude of state corrections is greater than the state corrections threshold for any state in each of the sub-solutions.

Example 5 includes the method of any of Examples 1-4, wherein the GNSS receiver is in a vehicle that also includes an inertial navigation system (INS).

Example 6 includes the method of Example 5, wherein the INS comprises a set of inertial sensors operative to produce inertial measurements for the vehicle.

Example 7 includes the method of Example 6, wherein the inertial measurements for the vehicle are used by the INS to generate estimated kinematic state statistics for the vehicle.

Example 8 includes the method of any of Examples 5-7, wherein the INS comprises the at least one processor that includes the Kalman filter.

Example 9 includes the method of any of Examples 5-8, wherein: the at least one processor hosts a spoof detector module that includes a residual monitor that performs the first Kalman filter monitoring process, and a state corrections monitor that performs the second Kalman filter monitoring process; and when multiple erroneous GNSS measurements are detected, the spoof detector module outputs an indicator that a potential spoofing event is detected.

Example 10 includes the method of any of Examples 5-9, wherein the vehicle comprises a manned aircraft, an unmanned aircraft systems (UAS) vehicle, or an urban air mobility (UAM) vehicle.

Example 11 includes a system comprising: an inertial navigation system (INS) in a vehicle, the INS including at least one processor, and a set of inertial sensors operative to produce inertial measurements for the vehicle; and a global navigation satellite system (GNSS) receiver in the vehicle and in operative communication with the INS, the GNSS receiver operative to receive a plurality of satellite signals from multiple GNSS satellites; wherein the at least one processor hosts at least one navigation filter, and a spoof detector module in operative communication with the at least one navigation filter; wherein the at least one processor is operative to processes the satellite signals from the GNSS receiver and the inertial measurements from the inertial sensors in the at least one navigation filter to produce a navigation solution and a plurality of sub-solutions, which are sent to the spoof detector module to perform a residual monitoring process or a state corrections monitoring process, or both the residual monitoring and state corrections monitoring processes, to detect spoofing of the satellite signals received by the GNSS receiver; wherein the spoof detector module is operative to output a navigation solution, with a spoofing indicator when a spoof event is detected.

Example 12 includes the system of Example 11, wherein the spoof detector module includes a residual monitor operative to perform the residual monitoring process, which comprises: (a) performing a current GNSS measurement update; (b) for each sub-solution, computing a normalized residual of each GNSS measurement in the given sub-solution; (c) for each sub-solution, comparing the normalized residual of each GNSS measurement in the given sub-solution against a threshold; (d) determining whether at least one normalized residual is above the threshold for each sub-solution; (e) if at least one normalized residual is above the threshold for each sub-solution, annunciating a potential spoofing event, and skipping processing of the GNSS measurement in the current GNSS measurement update; and (f) waiting for a new GNSS measurement, and when a new GNSS measurement is received, repeating the residual monitoring process starting with step (a).

Example 13 includes the system of Example 12, wherein: if the determination is made that there is not at least one normalized residual above the threshold for each sub-solution, then the residual monitor processes the GNSS measurement in the current GNSS measurement update, and waits for a new GNSS measurement; and when a new GNSS measurement is received, the residual monitor repeats the residual monitoring process starting with step (a).

Example 14 includes the system of any of Examples 11-13, wherein the spoof detector module includes a state corrections monitor operative to perform the state corrections monitoring process, which comprises: (a) performing a current GNSS measurement update; (b) for each sub-solution, computing a normalized state correction of each state; (c) for each sub-solution, comparing the normalized state correction of each state against a threshold; (d) determining whether at least one normalized state correction is above the threshold for each sub-solution; (e) if at least one normalized state correction is above the threshold for each sub-solution, then annunciating a potential spoofing event, and skipping processing of the GNSS measurement in the current GNSS measurement update; and (f) waiting for a new GNSS measurement, and when a new GNSS measurement is received, repeating the state corrections monitoring process starting with step (a).

Example 15 includes the system of Example 14, wherein: if the determination is made that there is not at least one normalized state correction above the threshold for each sub-solution, then the state correction monitor processes the GNSS measurement in the current GNSS measurement update, and waits for a new GNSS measurement; and when a new GNSS measurement is received, the state corrections monitor repeats the state corrections monitoring process starting with step (a).

Example 16 includes the system of any of Examples 14-15, wherein determining whether at least one normalized state correction is above the threshold for each sub-solution in step (d) comprises: requiring the normalized state correction to be above the threshold for the same state in each sub-solution; or allowing the normalized state correction to be above the threshold for any state in each sub-solution.

Example 17 includes the system of any of Examples 11-16, wherein: the set of inertial sensors comprises an inertial measurement unit (IMU); and the at least one navigation filter includes one or more Kalman filters.

Example 18 includes the system of any of Examples 11-17, wherein the inertial measurements for the vehicle are used by the INS to generate estimated kinematic state statistics for the vehicle.

Example 19 includes the system of any of Examples 11-18, wherein the vehicle comprises a manned aircraft, an unmanned aircraft systems (UAS) vehicle, or an urban air mobility (UAM) vehicle.

Example 20 includes a program product comprising: a processor readable medium having instructions stored thereon, executable by at least one processor, to perform a method for detecting failure of multiple navigation satellite signals, the method comprising: receiving a plurality of satellite signals in at least one Global Navigation Satellite System (GNSS) receiver from multiple GNSS satellites, the GNSS receiver in operative communication with at least one Kalman filter; processing the satellite signals in the at least one Kalman filter to produce a navigation solution and a plurality of sub-solutions; and performing at least one of a Kalman filter residual monitoring process, or a Kalman filter state corrections monitoring process; wherein the Kalman filter residual monitoring process comprises: determining an expected magnitude of measurement residuals in the at least one Kalman filter for each of the sub-solutions; computing an actual magnitude of measurement residuals in the at least one Kalman filter for each of the sub-solutions; comparing the expected magnitude of measurement residuals to the actual magnitude of measurement residuals, for each of the sub-solutions, to determine whether the actual magnitude of measurement residuals is greater than a residual threshold; and detecting multiple erroneous GNSS measurements when at least one of the actual magnitude of measurement residuals is greater than the residual threshold for each of the sub-solutions; wherein the Kalman filter state corrections monitoring process comprises: determining an expected magnitude of state corrections in the at least one Kalman filter for each of the sub-solutions; computing an actual magnitude of state corrections in the at least one Kalman filter for each of the sub-solutions; comparing the expected magnitude of state corrections to the actual magnitude of state corrections, for each of the sub-solutions, to determine whether the actual magnitude of state corrections is greater than a state corrections threshold; and detecting multiple erroneous GNSS measurements when the actual magnitude of state corrections is greater than the state corrections threshold for each of the sub-solutions; wherein when multiple erroneous GNSS measurements are detected, outputting an indicator that a potential spoofing event is detected.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method for detecting failure of multiple navigation satellite signals, the method comprising:
providing at least one processor that hosts a navigation filter, and a spoof detector module that receives a navigation solution and a plurality of sub-solutions from the navigation filter, wherein the spoof detector module includes a residual monitor and a state corrections monitor;

receiving a plurality of satellite signals in at least one Global Navigation Satellite System (GNSS) receiver from multiple GNSS satellites, the GNSS receiver in operative communication with the at least one processor;

processing the satellite signals in the navigation filter to produce the navigation solution and the plurality of sub-solutions; and performing at least one of a residual monitoring process, or a state corrections monitoring process;

wherein the residual monitoring process is performed by the residual monitor and comprises:
  determining an expected magnitude of measurement residuals in a Kalman filter for each of the sub-solutions;
  computing an actual magnitude of measurement residuals in the Kalman filter for each of the sub-solutions;
  comparing the expected magnitude of measurement residuals to the actual magnitude of measurement residuals, for each of the sub-solutions, to determine whether the actual magnitude of measurement residuals is greater than a residual threshold; and
  detecting multiple erroneous GNSS measurements when at least one of the actual magnitude of measurement residuals is greater than the residual threshold for each of the sub-solutions;

wherein the state corrections monitoring process is performed by the state corrections monitor and comprises:
  determining an expected magnitude of state corrections in the Kalman filter for each of the sub-solutions;
  computing an actual magnitude of state corrections in the Kalman filter for each of the sub-solutions;
  comparing the expected magnitude of state corrections to the actual magnitude of state corrections, for each of the sub-solutions, to determine whether the actual magnitude of state corrections is greater than a state corrections threshold; and
  detecting multiple erroneous GNSS measurements when the actual magnitude of state corrections is greater than the state corrections threshold for each of the sub-solutions.

2. The method of claim 1, wherein the residual monitoring process or the state corrections monitoring process, operate on a single measurement from each GNSS satellite at a given point in time over multiple time frames.

3. The method of claim 1, wherein each of the sub-solutions is a separate solution, based on the Kalman filter, which does not process measurements from a particular one of the multiple GNSS satellites at a given point in time.

4. The method of claim 1, wherein in the state corrections monitoring process:
  the actual magnitude of state corrections is greater than the state corrections threshold for the same state in each of the sub-solutions; or
  the actual magnitude of state corrections is greater than the state corrections threshold for any state in each of the sub-solutions.

5. The method of claim 1, wherein the GNSS receiver is in a vehicle that also includes an inertial navigation system (INS).

6. The method of claim 5, wherein the INS comprises a set of inertial sensors operative to produce inertial measurements for the vehicle.

7. The method of claim 6, wherein the inertial measurements for the vehicle are used by the INS to generate estimated kinematic state statistics for the vehicle.

8. The method of claim 5, wherein the INS comprises the at least one processor that hosts the navigation filter.

9. The method of claim 5, wherein:
  when multiple erroneous GNSS measurements are detected, the spoof detector module outputs an indicator that a potential spoofing event is detected.

10. The method of claim 5, wherein the vehicle comprises a manned aircraft, an unmanned aircraft systems (UAS) vehicle, or an urban air mobility (UAM) vehicle.

11. A system comprising:
  an inertial navigation system (INS) in a vehicle, the INS including at least one processor, and a set of inertial sensors operative to produce inertial measurements for the vehicle; and
  a global navigation satellite system (GNSS) receiver in the vehicle and in operative communication with the INS, the GNSS receiver operative to receive a plurality of satellite signals from multiple GNSS satellites;
  wherein the at least one processor hosts at least one navigation filter, and a spoof detector module operative to receive a navigation solution and a plurality of sub-solutions from the at least one navigation filter;
  wherein the spoof detector module includes a residual monitor and a state corrections monitor;
  wherein the at least one processor is operative to processes the satellite signals from the GNSS receiver and the inertial measurements from the inertial sensors in the at least one navigation filter to produce the navigation solution and the plurality of sub-solutions, which are sent to the spoof detector module to perform a residual monitoring process in the residual monitor or a state corrections monitoring process in the state corrections monitor, or both the residual monitoring and state corrections monitoring processes, to detect spoofing of the satellite signals received by the GNSS receiver;
  wherein the spoof detector module is operative to output a navigation solution, with a spoofing indicator when a spoof event is detected.

12. The system of claim 11, wherein the residual monitoring process performed by the residual monitor comprises:
  (a) performing a current GNSS measurement update;
  (b) for each sub-solution, computing a normalized residual of each GNSS measurement in the given sub-solution;
  (c) for each sub-solution, comparing the normalized residual of each GNSS measurement in the given sub-solution against a threshold;
  (d) determining whether at least one normalized residual is above the threshold for each sub-solution;
  (e) if at least one normalized residual is above the threshold for each sub-solution, annunciating a potential spoofing event, and skipping processing of the GNSS measurement in the current GNSS measurement update; and
  (f) waiting for a new GNSS measurement, and when a new GNSS measurement is received, repeating the residual monitoring process starting with step (a).

13. The system of claim 12, wherein:
  if the determination is made that there is not at least one normalized residual above the threshold for each sub-solution, then the residual monitor processes the GNSS measurement in the current GNSS measurement update, and waits for a new GNSS measurement; and when a new GNSS measurement is received, the residual monitor repeats the residual monitoring process starting with step (a).

14. The system of claim 11, wherein the state corrections monitoring process performed by the state corrections monitor comprises:
    (a) performing a current GNSS measurement update;
    (b) for each sub-solution, computing a normalized state correction of each state;
    (c) for each sub-solution, comparing the normalized state correction of each state against a threshold;
    (d) determining whether at least one normalized state correction is above the threshold for each sub-solution;
    (e) if at least one normalized state correction is above the threshold for each sub-solution, then annunciating a potential spoofing event, and skipping processing of the GNSS measurement in the current GNSS measurement update; and
    (f) waiting for a new GNSS measurement, and when a new GNSS measurement is received, repeating the state corrections monitoring process starting with step (a).

15. The system of claim 14, wherein:
    if the determination is made that there is not at least one normalized state correction above the threshold for each sub-solution, then the state correction monitor processes the GNSS measurement in the current GNSS measurement update, and waits for a new GNSS measurement; and
    when a new GNSS measurement is received, the state corrections monitor repeats the state corrections monitoring process starting with step (a).

16. The system of claim 14, wherein determining whether at least one normalized state correction is above the threshold for each sub-solution in step (d) comprises:
    requiring the normalized state correction to be above the threshold for the same state in each sub-solution; or
    allowing the normalized state correction to be above the threshold for any state in each sub-solution.

17. The system of claim 11, wherein:
    the set of inertial sensors comprises an inertial measurement unit (IMU); and
    the at least one navigation filter includes one or more Kalman filters.

18. The system of claim 11, wherein the inertial measurements for the vehicle are used by the INS to generate estimated kinematic state statistics for the vehicle.

19. The system of claim 11, wherein the vehicle comprises a manned aircraft, an unmanned aircraft systems (UAS) vehicle, or an urban air mobility (UAM) vehicle.

20. A program product comprising:
    a non-transitory processor readable medium having instructions stored thereon, executable by at least one processor that hosts a navigation filter, to perform a method for detecting failure of multiple navigation satellite signals, the method comprising:
        receiving a plurality of satellite signals in at least one Global Navigation Satellite System (GNSS) receiver from multiple GNSS satellites, the GNSS receiver in operative communication with the at least one processor;
        processing the satellite signals in the navigation filter to produce a navigation solution and a plurality of sub-solutions; and
        performing a Kalman filter residual monitoring process, and a Kalman filter state corrections monitoring process, in a spoof detector module that receives the navigation solution and the plurality of sub-solutions from the navigation filter, wherein the spoof detector module includes a residual monitor and a state corrections monitor;
        wherein the Kalman filter residual monitoring process is performed by the residual monitor and comprises:
            determining an expected magnitude of measurement residuals in a Kalman filter for each of the sub-solutions;
            computing an actual magnitude of measurement residuals in the Kalman filter for each of the sub-solutions;
            comparing the expected magnitude of measurement residuals to the actual magnitude of measurement residuals, for each of the sub-solutions, to determine whether the actual magnitude of measurement residuals is greater than a residual threshold; and
            detecting multiple erroneous GNSS measurements when at least one of the actual magnitude of measurement residuals is greater than the residual threshold for each of the sub-solutions;
        wherein the Kalman filter state corrections monitoring process is performed by the state corrections monitor and comprises:
            determining an expected magnitude of state corrections in the Kalman filter for each of the sub-solutions;
            computing an actual magnitude of state corrections in the Kalman filter for each of the sub-solutions;
            comparing the expected magnitude of state corrections to the actual magnitude of state corrections, for each of the sub-solutions, to determine whether the actual magnitude of state corrections is greater than a state corrections threshold; and
            detecting multiple erroneous GNSS measurements when the actual magnitude of state corrections is greater than the state corrections threshold for each of the sub-solutions;
        wherein when multiple erroneous GNSS measurements are detected, outputting an indicator that a potential spoofing event is detected.

* * * * *